(No Model.)
T. LINDSAY.
FISHING NET CONTROLLING DEVICE.
No. 575,360. Patented Jan. 19, 1897.
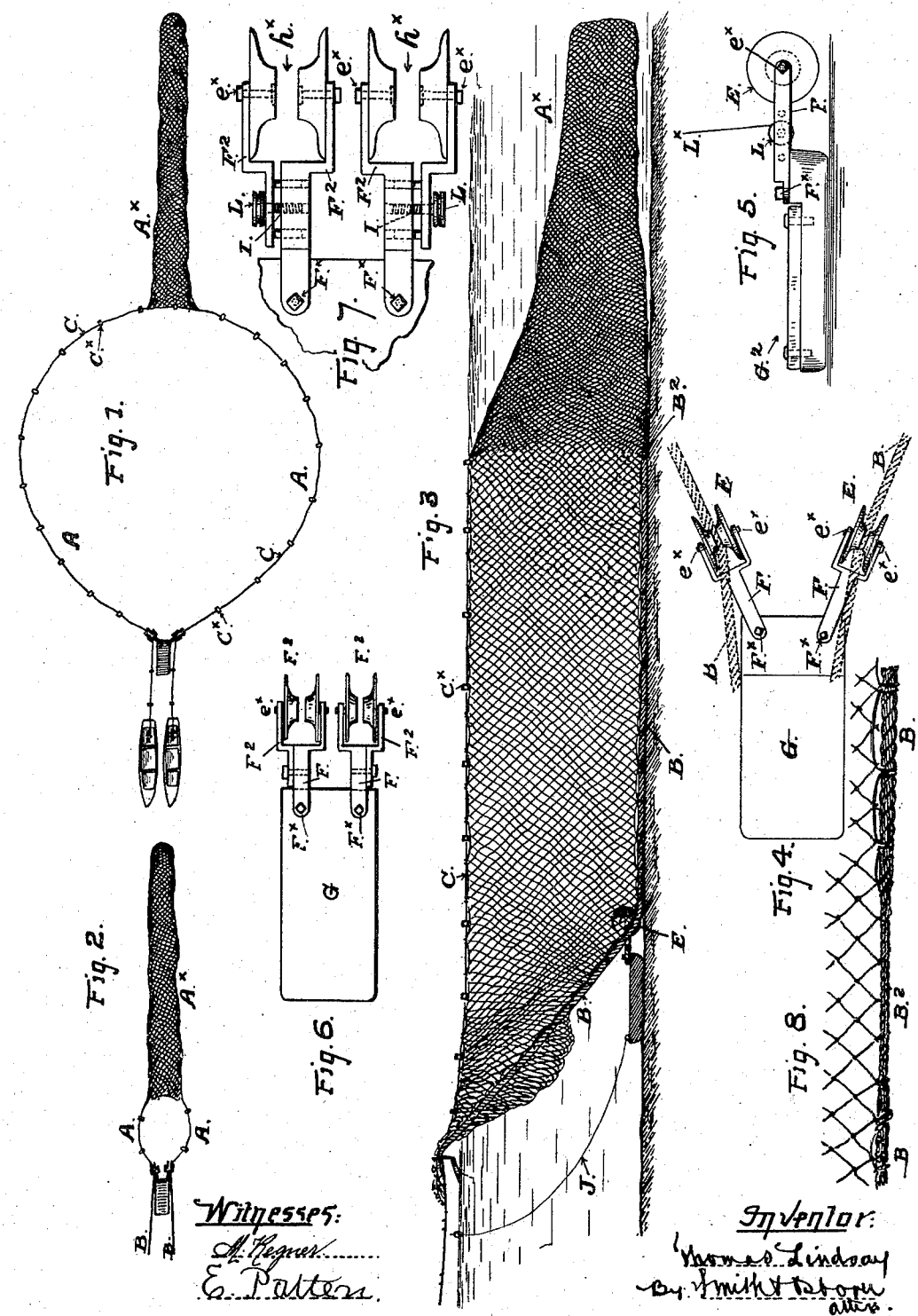
Witnesses:
M. Regner
E. Patten
Inventor:
Thomas Lindsay
By Smith & Doorn
attys.

UNITED STATES PATENT OFFICE.

THOMAS LINDSAY, OF CAPITOLA, CALIFORNIA.

FISHING-NET-CONTROLLING DEVICE.

SPECIFICATION forming part of Letters Patent No. 575,360, dated January 19, 1897.

Application filed February 24, 1896. Serial No. 580,492. (No model.)

*To all whom it may concern:*

Be it known that I, THOMAS LINDSAY, a subject of the Queen of Great Britain, residing at Capitola, in the county of Santa Cruz and State of California, have invented certain new and useful Improvements in Lead-Line Controllers for Fishing-Nets, of which the following is a specification.

My invention relates to a novel means or device for handling and controlling fishing-nets of the class or description commonly known as "seines," or nets that are provided with floats on one side and sinkers on the other, to keep them in upright position in the water. Nets of this description are worked by drawing them through the water in a gradually-contracting circle, while they are kept in upright position by means of the floats on the top edge and the sinkers or leads on the lower edge, which keep the net down in working position close to the bottom. But while such nets can ordinarily be kept against the bottom when they are hauled in from the beach they cannot be worked to advantage at a distance from the shore from boats, because of the difficulties that arise by reason of the angular position assumed by the lead-line or bottom line of the net while being hauled into the boat and the subsequent loss of fish from the inside of the nets under the lead-line or bottom edge.

My invention has for its object mainly to control this lead-line or bottom line and hold it down in working position against or in close relation to the sea-bottom in such manner that the lower edges of the net are kept upon the bottom and are brought together in a gradually-contracting circle in the operation of hauling the net.

It has for its object also to enable a seine to be worked outside the line of breakers and in comparatively still water, thereby reducing the labor of hauling and effecting a considerable saving in wear of the nets.

To such end and objects my invention consists in a device, which I have termed, for the purpose of description, "a lead-line controller" for fish-nets, comprising, mainly, a pair of split or open sheaves or flanged pulleys and a drag or weight combined therewith, the same being constructed and arranged for operation as hereinafter fully explained and set forth in the following description, in which reference is had by letters to the accompanying drawings, that form part of this specification.

Figure 1 is a plan or top view of a device constructed according to my invention, illustrating the application of the same to a net of the kind commonly known as a "wing-net." Fig. 2 is a similar view showing the position assumed by this controlling device and the net during the latter part of the operation of handling. Fig. 3 is a side view of Fig. 2, on an enlarged scale, with one of the wings removed and the controller shown in section. Fig. 4 is a top view of the controller, on an enlarged scale, illustrating one position of the sheaves when in operation. Fig. 5 is a side elevation of the controller as provided with a means for opening the sheave-sections from above the surface of the water while the drag is resting on the bottom. Fig. 6 is a top view of the drag without such adjusting means. Fig. 7 is a top view, on an enlarged scale, of the sheaves and the mechanism for setting the sheave-sections toward and away from each other. Fig. 8 is a view of a portion of the lead-line with net attached thereto, and showing the decreased diameter of the line.

A indicates a seine of the kind formed of wings and a central bag or tunnel. B is the lead-line on the bottom or lower edge, and C is the line on the top edge, to which the floats $C^x$ are attached. This net is of the usual construction, excepting that the rope forming the lead-line or bottom line is somewhat larger and heavier than that heretofore used. By employing a large rope I can dispense with leads or sinkers in many cases, especially in fishing on smooth sandy bottoms, as the weight of the rope will be found sufficient to hold the bottom edges of the net in working position; and, in addition to this advantage, the large rope acts to make the net haul more smoothly and prevents the body of the net from rolling and becoming tangled with the rope while moving on the bottom. In cases where additional weight is needed leads $d\ d$ can be secured on the rope.

E E are two sheaves or flanged pulleys, each set in a swinging yoke or carrier F which is attached by a pivot $F^x$ to a heavy drag G and is capable of swinging sidewise in an arc on such pivot. Each sheave is composed of two halves or sections that are mounted on independent spindles or axles $e^\times$ in the two arms $F^2$ of the carrier and are set to work at such distance apart that a clear open space $h^\times$ is left between the hubs or bodies of the two sheave-sections. One of the arms of this carrier is made adjustable laterally to and from the other arm by means of a screw I for the purpose of regulating the clearance or opening between the two sections. This construction is the same in the carriers of both sheaves.

The weight G is made of proper shape to lie on the bottom and to drag or travel thereon under the strain on the lead-line during the operation of hauling the seine, and provision is made for increasing and reducing the weight of the drag by adding to it a removable block or pieces $G^\times$ for the purpose of adjusting the same to work properly under varying conditions. These parts constitute the essential features of the controller.

In adjusting and applying this controller for operation the sheave-sections are so set that the bottom rope or lead-line will run smoothly through the sheave and the body of the net will pass between and play freely through the slot or opening between the two sections, it being understood that the rope is introduced from beneath upward, so that it runs under the sheave and through the opening between the arms of the carrier, as shown in Fig. 4. The two ropes B B are passed in this manner through the two sheaves after the wings of the net have been laid and set in a circle by the boats, and the drag is then thrown overboard and allowed to sink to the bottom, a line J being secured to it for raising it again.

The position of the drag and the sheaves at such time, when the net is properly laid and ready to be hauled, will be understood from Figs. 2 and 3 of the drawings, where it will be seen that the two ropes B B, extending from the sheaves up to the surface of the water, stand at an angle, while the remaining portions of the ropes from the sheaves back to the bag or funnel $A^\times$ are held down closely to the bottom. Now in this position, as the two ends of the wings are hauled in the ropes play through the sheaves and the meshes or body of the net pass freely between the sheave-sections, while the circle in which the wings were laid is gradually contracted as the wings are drawn into the boats. In this operation the drag travels forward toward the bag under the pulling strain then thrown upon the rope B B, and during all the time that the two wings are moving toward each other in a gradually-contracting circle that portion of the lead-line or bottom rope lying between the sheaves and the bag is held down upon the bottom. In this manner the lead-line is kept smooth and prevented from rolling and becoming entangled with the meshes of the net, and it is controlled until both wings or ends of the net have been raised to the surface and the bag is reached. At this point the lead-line is caused to unship automatically and release itself from the controller on the bottom by inserting in the rope or line B at the middle or the part where the wings are joined to the mouth of the bag a section of rope $B^2$ of small diameter and of proper size to pass freely through the opening between the two sections of the sheaves, so that as such smaller section of the lead-line reaches the controller-sheave it slips through the opening between the sheave-sections, together with the meshes or bag of the net, and thus frees the net from the drag. This controller is afterward drawn up by means of the safety-line attached to it for that purpose. Provision is made also for freeing the lead-line from the sheaves of the controller at any time during the operation after it has been sunk and when it is lying on the bottom, such, for instance, as where the net or the line may have become fouled or entangled with rocks or weeds. For this purpose I fix on the head of each adjusting-screw a grooved wheel L K, to which I attach one end of a line $L^\times$, laying such line in several turns in the grooves of such wheel and securing the upper end of the line to a float at the surface. Thus by drawing up the line $L^\times$ at any time while the controller is lying on the bottom the screw to which the grooved wheel is fastened will be turned, the arms of the carrier will be spread apart, and the two sheave-sections will be opened sufficiently to let the lead-line slip through. By this means the lead-line can be unshipped from both sheaves while the controller is on the bottom.

Having thus described my invention, what I claim as new therein, and desire to secure by Letters Patent, is—

1. A lead-line controller for fishing-nets, comprising a drag and a pair of sheaves attached to one end of the drag by pivoted carriers to swing laterally in a horizontal plane, each sheave being composed of two sections on separate axles, with a clear space between them, and means for adjusting one of such sections to and from the other, substantially as described.

2. In a lead-line controller for fishing-nets, the combination, of a drag; a sheave-carrier pivotally attached to said drag to swing laterally outward thereon, and composed of two arms or members one of which has provision for adjustment laterally to and from the other arm or member; a split sheave, the parts of which have independent bearings in the two members of said carrier; mechanism connecting the adjustable member thereof with the fixed member to move the former to and from the latter for the purpose of regulating the width of the opening between the two sheave-sections; and an operating-line attached to such adjusting mechanism to operate the same from above the surface of the water when the controller is resting on the bottom, substantially as described.

3. In a fishing-net controller, a lead-line formed of a rope having in the middle of its length a portion which is of smaller diameter than the main portion of the line; in combination with a drag and a pair of split sheaves mounted on said drag and through which the two ends of the said lead-line are passed from beneath upward, the sections of said sheaves being set at proper distance apart to let the reduced middle portion of the lead-line slip through and to stop the main portion of the lead-line, substantially as described.

In testimony that I claim the foregoing I have hereunto set my hand and seal.

THOMAS LINDSAY. [L. S.]

Witnesses:
C. W. M. SMITH,
CHAS. E. KELLY.